United States Patent Office 3,392,185
Patented July 9, 1968

1

3,392,185
PROCESS OF SULFATING ALKOXYLATED
DERIVATIVES OF ALIPHATIC ALCOHOLS
AND PHENOLS
John M. Walts, Clark, and Leslie M. Schenck, Mountainside, N.J., assignors to General Aniline & Film Corporation, New York, N.Y., a corporation of Delaware
No Drawing. Filed Nov. 12, 1965, Ser. No. 507,558
6 Claims. (Cl. 260—457)

ABSTRACT OF THE DISCLOSURE

Ammonium salts of sulfuric acid esters of alkoxylated derivatives of aliphatic alcohols and phenols, which are surface active agents having good detergency, are prepared by complexing 1 mole of urea in 2 moles of a compound having the following formula:

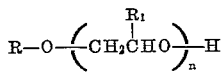

wherein R is either an alkyl of from 8 to 18 carbon atoms or a phenyl which may be unsubstituted or substituted by 1 to 2 alkyl groups of from 4 to 18 carbon atoms, $R_1$ is either hydrogen or methyl, and $n$ is a positive integer of from 1 to 10, at a temperature of from 15° to 25° C., adding to the resulting solution containing the complex one mole of sulfur trioxide followed by the addition of one mole of sulfuric acid and heating the resulting mixture to a temperature within the range of 35° to 125° C., for a period of time until the evolution of carbon dioxide ceases and recovering said ammonium salt.

This invention relates to an improved method of preparing ammonium salts of sulfuric acid esters of alkoxylated derivatives of aliphatic alcohols and phenols.

It is well known that alkylphenol polyglycol ether sulfates, as described in Steindorff et al., U.S. Patent 2,203,883 issued June 11, 1940, are valuable surface active agents having good detergency. Through the ensuing years, numerous methods have been proposed for converting polyglycol ether alkylphenols of the type disclosed in said patent to their sulfate esters by means of chlorosulfonic acid, in which ring sulfonation of the alkylphenoxy moiety accounts for less than 10% of the organically combined sulfuric acid, and by means of sulfur trioxide. However, when sulfur trioxide or chlorosulfonic acid are used for this purpose, the application is attendant with difficulties. These sulfating agents are difficult to deal with because of their corrosive, foaming, and hygroscopic nature. It is difficult to scale up apparatus for their use, since the reaction is exceedingly exothermic and cooling of a viscous mixture is needed to moderate the reaction. Because of their high reactivity with polyalkoxylated derivatives of alkylphenols, conditions must be stringently controlled to avoid appreciable charring and by-product formation during sulfation.

To overcome this appreciable charring, it has been proposed to sulfate ethylene oxide adducts of alkylated phenols and the like with a composition of matter consisting essentially of a combination of $SO_3$ derived from a member of the groups consisting of $SO_3$, chlorosulfonic acid and oleum with a trialkyl phosphate, said composition constituting an $SO_3$-trialkylphosphate complex containing from one to three moles of $SO_3$ per mole of trialkylphosphate. Although the proposal is commendable, the sulfated organic is contaminated by a trialkylphosphate containing from one to 18 carbons per alkyl by this approach.

Sulfation of alkylphenol alkoxylates has likewise been carried out by heating them with a slight molecular excess of sulfamic acid to temperatures in the neighborhood of 140° C. The reaction, considered stochiometrically, is one of addition, the product being the ammonium salt of the sulfuric ester. This approach is further discussed by Schwartz, Perry and Berch, vol. II, Interscience Publishers, Inc., New York (1959), p. 56.

The difficulties associated with using $SO_3$, concentrated sulfuric acid, and chlorosulfonic acid as sulfating agents, have been recognized by the disclosure in U.S. Patent 3,172,901. To avoid the problems of these agents, sulfamic acid is proposed in said patent as a useful mild sulfating agent, since it is easy to deal with under moderate conditions. However, it is pointed out that the disadvantage of the sulfamic acid method is its cost in comparison with $SO_3$ and chlorosulfonic acid.

The cost of sulfamic acid can be realized by referring to U.S. 2,419,618, in which the manufacture of sulfamic acid by the interaction of urea, sulfuric acid and $SO_3$ is disclosed. True, notable improvements have been made in simplifying reaction conditions, as revealed in U.S. 2,880,064. However, from a practical standpoint, the following quotation from U.S. 2,127,240 exemplifies the prior art of sulfamic acid manufacture from its basic raw materials, urea, sulfuric acid, and oleum:

"Although the reaction of sulfuric acid, sulfur trioxide and urea was known—Baumgarten U.S. Patent 2,102,350, Ber. 69B, 1929-37—from a practical commercial operation many problems were encountered due to the inherent nature of the reaction which is strongly exothermic and actually proceeds with considerable violence. In addition, the reactant product, sulfamic acid, is a relatively high melting point chemical, 205° C., and consequently presents a serious problem with respect to processing and separation of the sulfamic acid from the reaction products as well as heat transfer. Various methods have been proposed to overcome these processing problems with indifferent success. One suggestion was to use excess sulfuric acid which, while it permitted the reaction to be carried out in the liquid phase, did not ameliorate all the difficulties and indeed created new problems. More specifically, sulfuric acid being a reactant did not avoid the violence of reaction and further resulted in a slurry of sulfamic acid in sulfuric acid solution from which it was most difficult to separate the sulfamic acid. Furthermore, the operation was complicated by corrosion problems brought about by the many different strengths of sulfuric acid involved. In another attempt to overcome the problems, excess sulfur trioxide, also a reactant, was used as a reaction medium where again it was found difficult to control the reaction and also to remove residual sulfur trioxide from the product. Furthermore, the use of excess sulfur trioxide necessitates pressure equipment in the desired temperature range of about 55–75° C., thereby appreciably increasing the cost of capital investment. Other solvent mediums were also tried but found wanting for one or more of the above reasons."

In U.S. 3,127,240, a sulfamic acid process is described which overcomes certain of the difficulties enumerated above by maintaining an admixture of urea, $SO_3$, $H_2SO_4$ and sulfuryl chloride at a temperature within the range of 55–75° C. in an enclosed reaction zone under substantially atmospheric pressures to effect reaction of the urea, $SO_3$, and $H_2SO_4$ to produce sulfamic acid and by-product, $CO_2$, releasing generated $CO_2$ and sulfulryl chloride from the reaction zone, cooling the carbon dioxide gas and sulfuryl chloride vapor to effect condensation of the sulfuryl chloride, discharging the $CO_2$ gas, returning the sulfuryl chloride condensate to the reaction zone to maintain the temperature of the reaction therein within the range of 55–75° C., and continuing the passage of evolved sulfuryl chloride vapor from the reaction zone, cooling of the sulfuryl chloride vapor and return of the sulfuryl chloride condensate to the reaction zone until substantial completion of the reaction of urea, SO₃, and H₂SO₄ is effected.

Although the sulfamic acid produced by any of the above methods is satisfactory for conversion of polyalkoxylated derivatives of alkylphenols to their sulfamic acid esters, the cost of its manufacture does not make it competitive with other sulfating agents.

U.S. 2,814,612 teaches the formation of a solid urea-nonionic adduct by treating a surface active agent of the type R—($CH_2CH_2O$)$_n$—$CH_2CH_2OH$, wherein $n=5$ to 50, in the presence of $SO_2$, with urea. The weight ratio of surface active agent and urea is in a ratio in the range of 1:1 to 1:5 parts by weight. A similar teaching appears in U.S. 2,824,091, which describes reacting urea with nonionic surface active agents in the presence of a diluent, such as a hydrocarbon, and a reaction activator, such as water, low molecular weight alcohols, ketones, etc., to produce solid nonionic surface active agents.

It is the principal object of the present invention to provide an improved process of preparing ammonium salts of sulfuric acid esters of mono- and poly-alkoxylated derivatives of aliphatic alcohols and phenols by a simplified reaction in an economical manner.

Other objects and advantages will become apparent from the following description.

We have found that the deficiencies and shortcomings encountered in sulfating mono- and poly-alkoxy aliphatic alcohols and phenols with SO₃ and chlorosulfonic acid, and the adverse economics of sulfamic acid sulfation are overcome by a reaction in which no violent exotherm occurs, in which there is no charring or other adverse effect, in which sulfonation in the aromatic (phenolic) nucleus is not greater than about 1.5%, and in which no specialized equipment is required. The reaction involves reacting one mole of urea in two moles of a mono- or poly-alkoxylated aliphatic alcohol or phenol at a temperature of from 15° to 25° C. to form a complex. The dissolution of urea and complexing it with the alkoxylated aliphatic alcohol or phenol may be expedited by agitation. As an alternate, an admixture of one mole of urea and two moles of said alkoxylated alcohol or phenol may be complexed at elevated temperature with agitation and the resulting solution cooled to a temperature of from 15° to 20° C. To the solution of the complex of a temperature of from 15° to 25° C., there is added 1 mole of gaseous sulfur trioxide, which may be diluted with about 10 to 95 parts by volume of dry nitrogen or dry air, over a period of time ranging from 1 to 2 hours, followed by the slow addition of 1 mole of sulfuric acid of 96% to 100% concentration within the same temperature range, i.e., 15° to 25° C. The sulfuric acid may be added over a period of time ranging from one-half to one hour. After the addition of the sulfuric acid is complete, the reaction mixture is heated to a temperature ranging from 35° to 125° C. for a period of time ranging from 3 to 4 hours. Under these operating conditions, a mild reaction ensues with a mild evolution of carbon dioxide, which increases in volume as the temperature is increased from 35° to 125° C. Within 3 to 4 hours and within this temperature range, the evolution of carbon dioxide ceases and the alkoxylated aliphatic alcohol or phenol is converted to the ammonium salt of its sulfuric acid ester. The latter is recovered as such and used as a surfactant or it may be diluted with an ethanol-water mixture and neutralized to a pH of 6.5 to 7.5 with monoethanolamine, diethanolamine, aqueous sodium, potassium, or ammonium hydroxide, and the like.

The alkoxylated phenols and alkoxylated aliphatic alcohols that are converted to the ammonium salts of their sulfuric acid esters in accordance with the present invention are characterized by the following general formula:

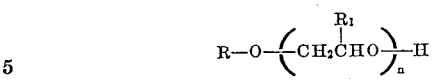

wherein R represents an alkyl radical containing from 8 to 27 carbon atoms, e.g., octyl, nonyl, decyl, hendecyl, dinonyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, and heptacosyl, or an aryl radical of 6 to 24 carbon atoms, e.g., phenyl, diphenyl, naphthyl, etc., which are unsubstituted or substituted by one or two alkyl groups of from 4 to 18 carbon atoms, e.g., butylphenyl, dibutylphenyl, nonylphenyl, dinonylphenyl, octadecylphenyl, di-octadecylphenyl, etc., $R_1$ represents either hydrogen or methyl group and wherein the ethoxy and propoxy units are arranged in any order when both of said units are present, and $n$ represents a positive integer of from 1 to 10.

The alkoxylated phenols and alkoxylated aliphatic alcohols characterized by the foregoing formula are readily prepared by alkoxylating aliphatic alcohols or phenols with ethylene oxide or propylene oxide or with a mixture of such oxides by the usual methods known to the art. Suitable methods for their preparation are described in U.S. Patents 1,970,578, 2,203,883, 2,213,477, 2,575,832, 2,593,112 and 2,676,975.

The following examples will illustrate the process of the present invention by which the alkoxylated phenols and alkoxylated aliphatic alcohols are converted to ammonium salts and which have the following formula:

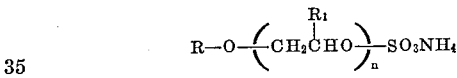

wherein R, $R_1$ and $n$ have the values as above.

Example 1

To 290.0 grams (0.6 mole) of a nonylphenol ethoxylate containing 54.5% ethylene oxide by weight were added 20.0 grams (0.33 mole) of urea with agitation at 15–20° C. There were added over 1½ hours at 15–25° C., 26.6 grams (0.33 mole) of gaseous SO₃ diluted with about 10–20 parts by volume of dry nitrogen. There were then added dropwise over 40 minutes at 15–25° C., 32.6 grams (.33 mole) of sulfuric acid of 100% concentration. The reaction mixture was then heated to 35° C. over one hour. At this point, the conversion of the nonylphenyl ethoxylate to the ammonium salt of its sulfuric acid ester was 37.3% complete as measured by the methylene blue analysis (S. R. Epstein, Trans. Faraday Society, vol. 44, 226–230 (1948)). The percentage of aromatic ring sulfonation was less than one percent. The temperature was then increased incrementally over 3½ hours to 125° C. During this period, there was a continuing evolution of carbon dioxide. The reaction was maintained at 125° C. until conversion of the alkylphenol ethoxylate to its ammonium sulfate ester was substantially complete, about 3½ hours. The reaction product was diluted with 50–50 ethanol-water solution until 58% active by methylene blue analysis, and adjusted to pH 7 by addition of ethanolamine. Less than 1% of the reacted sulfur compound was found attached to the nonylphenyl ring.

Example 2

To 104.0 grams (0.2 mole) of nonionic product obtained by condensing one mole of octadecylphenol with three moles of propylene oxide were added 6 grams of urea (0.1 mole) at 20° C. Operating as in Example 1, there were then added 8 grams (0.1 mole) SO₃ diluted with 95 parts by volume of dry air, followed by 10.2 grams (0.1 mole) of sulfuric acid of 96% concentration. The resultant admixture was heated at 90° C. for three hours, at which time there was 85.4% conversion of the nonionic to its ammonium sulfate ester.

Example 3

An admixture of 200 grams (0.8 mole) of the monoethoxylate of 2,4-di-sec-butylphenol and 24 grams (0.4 mole) of urea was maintained at 15° C. over two hours. Operating as in Example 1, there were then added 32 grams (0.4 mole) of SO₃ diluted with 95 parts by volume of dry air. There were then added dropwise over one hour at 15–20° C., 39.2 grams (0.4 mole) of sulfuric acid of 100% concentration. The mixture was heated to 115° C. over one hour and held at 115° C. for an additional two hours. The resultant product analyzed as 91.5% ammonium sulfate ester of 2,4-di-sec-butylphenoxyethanol. There was 1.3% sulfonation of the di-sec-butylphenyl nucleus.

Example 4

To 70.0 gm. (0.2 mole) of the adduct obtained by condensing 8 moles of ethylene oxide with 1 mole of octyl alcohol were added 6.0 gm. (0.1 mole) of urea at 25° C. The solution containing the complex was cooled to 25° C. and the procedure described in Example 1 was followed, using 0.1 mole each of SO₃ and sulfuric acid. The reaction mixture analyzed as 90.2% of product after 1½ hours at 125° C.

Example 5

To 65.4 grams (0.1 mole) of the heptaethoxylate of dinonylphenol were added 3.0 grams (0.05 mole) of urea at 25° C. The procedure described in Example 3 was then followed using .05 mole each of gaseous SO₃ and 100% sulfuric acid. The conversion to the ammonium sulfate ester was found to be 88.0%.

Example 6

To 126.0 grams (0.2 mole) of an oxo-tridecyl alcohol ethoxylate containing 68.2% ethylene oxide by weight were added 6.0 grams (0.1 mole) of urea at 25° C. Operating as in Example No. 1, there were then added 8.0 grams (0.1 mole) of gaseous SO₃ diluted with 70 parts by volume of dry air. There were then added dropwise over one hour at 35° C., 9.8 grams (0.1 mole) of sulfuric acid of 100% concentration. The mixture was heated to 100° C. over one-half hour and held at 100° C. for three hours. The mixture analyzed as 94.0% product.

Example 7

To 274.0 grams (1 mole) of nonionic obtained by condensing one mole decyl alcohol with two moles of propylene oxide were added 30.0 grams (0.5 mole) of urea at 15° C. Operating as in Example No. 1, there were added 40.0 grams (0.5 mole) of sulfur trioxide diluted with 92 parts by volume of dry air followed by a dropwise addition of 49.0 grams (0.5 mole) of H₂SO₄ of 100% concentration. The resultant mixture was heated to 110° C. and held for two hours after which time there was an 86.2% conversion of the nonionic to its ammonium sulfate ester.

Example 8

To 250.0 grams (0.4 mole) of nonionic obtained by condensing one mole of dodecyl alcohol with ten moles of ethylene oxide were added 12.0 grams (0.2 mole) of urea at 60° C. with agitation. The resulting solution containing the complex was cooled to 15° C. There were then added 16.0 grams (0.2 mole) of sulfur trioxide diluted with 75 parts by volume of dry nitrogen followed by a dropwise addition of 19.6 grams (0.2 mole) of sulfur acid of 100% concentration. The mixture was heated to 85° C. and held for 6 hours. The mixture analyzed as 94.7% ammonium sulfate ester of the nonionic.

We claim:

1. The method of preparing ammonium salts of sulfuric acid esters of alkoxylated derivatives of aliphatic alcohols and phenols which comprises complexing one mole of urea in two moles of a compound having the following formula

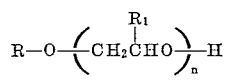

wherein R represents a member selected from the class consisting of alkyl of from 8 to 18 carbon atoms and phenyl, said phenyl substituted by 1 to 2 alkyl groups of from 4 to 18 carbon atoms, R₁ represents a member selected from the class consisting of hydrogen and methyl, and $n$ represents an integer of from 1 to 10, and at a temperature of from 15° to 25° C., adding to the resulting solution containing the complex one mole of sulfur trioxide followed by the addition of one mole of sulfuric acid and heating the resulting mixture to a temperature within the range of 35° to 125° C., for a period of time until the evolution of carbon dioxide ceases and recovering said ammonium salt.

2. The method according to claim 1 wherein the compound of said formula is nonylphenol ethoxylate containing 54.5% ethylene oxide by weight.

3. The method according to claim 1 wherein the compound of said formula is monoethoxylate of 2,4-di-sec-butylphenol.

4. The method according to claim 1 wherein the compound is tripropoxylate of octadecylphenol.

5. The method according to claim 1 wherein the compound of said formula is dipropoxylate of decyl alcohol.

6. The method according to claim 1 wherein the compound of said formula is heptaethoxylate of dinonylphenol.

References Cited

UNITED STATES PATENTS 3,332,979    7/1967    Redemann _____ 260—458

CHARLES B. PARKER, *Primary Examiner.*

L. C. MARUZO, *Assistant Examiner.*